United States Patent
Ward et al.

(10) Patent No.: US 7,062,753 B1
(45) Date of Patent: Jun. 13, 2006

(54) METHOD AND APPARATUS FOR AUTOMATED SOFTWARE UNIT TESTING

(75) Inventors: Richard B Ward, Suffolk (GB); John A Graham, Suffolk (GB); Martin R Aylett, Norfolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/936,175

(22) PCT Filed: Mar. 10, 2000

(86) PCT No.: PCT/GB00/00882

§ 371 (c)(1),
(2), (4) Date: Sep. 10, 2001

(87) PCT Pub. No.: WO00/58836

PCT Pub. Date: Oct. 5, 2000

(30) Foreign Application Priority Data

Mar. 31, 1999 (GB) .................................. 9907438.7
Jul. 13, 1999 (EP) .................................. 99305543

(51) Int. Cl.
*G06F 9/44* (2006.01)

(52) U.S. Cl. ........................................ 717/124; 714/38
(58) Field of Classification Search ........ 717/124–135, 717/115; 714/35, 38, 40, 41
See application file for complete search history.

(56) References Cited

U.S. PATENT DOCUMENTS 6,002,869 A * 12/1999 Hinckley ..................... 717/124
6,256,774 B1 * 7/2001 O'Leary et al. ............. 717/120
6,351,826 B1 * 2/2002 Kato ........................... 714/38

OTHER PUBLICATIONS

Binder, "Design for Testability in Object-Oriented Systems", Communications of the Association for Computing Machinery, vol. 37, No. 9, Sep. 1994, pp. 87-101, XP000485275.

* cited by examiner

*Primary Examiner*—Antony Nguyen-Ba
(74) *Attorney, Agent, or Firm*—Nixon & Vanderhye, P.C.

(57) ABSTRACT

A system method and apparatus are disclosed for testing software at a low level during its operation. The system comprises a registry, a test criteria store, a report generator and a tester. The system selects elements of software from a program under test, tests the elements against predetermined test criteria and reports the results.

13 Claims, 5 Drawing Sheets

Figure 4a

| Class | Method | Input | Output | Start State | End State |
|-------|--------|-------|--------|-------------|-----------|
|       |        |       |        |             |           |

| Class | Method ID | Method description (input, output & data types) |
|-------|-----------|--------------------------------------------------|
|       |           |                                                  |

413, 415, 417

METHOD AND APPARATUS FOR AUTOMATED SOFTWARE UNIT TESTING

BACKGROUND

1. Technical Field

The present invention relates to software testing and in particular to unit testing software during its operation. The invention can be applied advantageously, but not exclusively, to software produced using object oriented programming languages such as C++, Corba or Java.

2. Description of Related Art

Automated testing of software during its development is known. The tests are designed as part of a software development process and these are then programmed into specialised test tools and executed automatically. Many tools are commercially available to support this type of software development technique.

Software that checks itself during operation is also known and has been developed and applied widely. This may involve checking pre and post-conditions or assertions and looking for exceptions at appropriate points in the software during its normal execution (See "Self Testing Systems"—M Aylett and P Utton, BT Technology Journal 1992).

Known testing systems enable end-to-end tests to be run on operational software systems in order to test out the operation of individual facilities. However, there are currently no testing systems that easily enable low level tests to be run on a fully integrated and operational system. These tests are often termed "unit tests" and are applied directly to one or more individual units of code (e.g. a function, method, module or agent). This is in contrast to end-to-end tests of a system that run from a system or user interface. Unit tests are currently run manually or automatically during development before integration.

BRIEF SUMMARY OF EXEMPLARY NON-LIMITING EMBODIMENTS

According to the present invention there is provided a method of testing an operational integrated software system, said system comprising a plurality of software elements, said method comprising the steps of:
  a) automatically registering each active element of software in a registry;
  b) associating a set of test criteria with each registered element of software;
  c) selecting an element registered in the registry and testing the element in accordance with the associated set of test criteria; and
  d) capturing the results of the testing of the element and comparing them to the associated test criteria.

This provides the advantage of enabling unit testing to be carried out on an integrated software system during its operation that allows quick identification of latent or newly introduced faults in the software.

BRIEF DESCRIPTION OF THE DRAWINGS

FIGS. 4a and 4b are tables illustrating the data structures used and created by the program elements shown in FIG. 2.

DETAILED DESCRIPTION OF EXEMPLARY NON-LIMITING EMBODIMENTS

Figure 1:
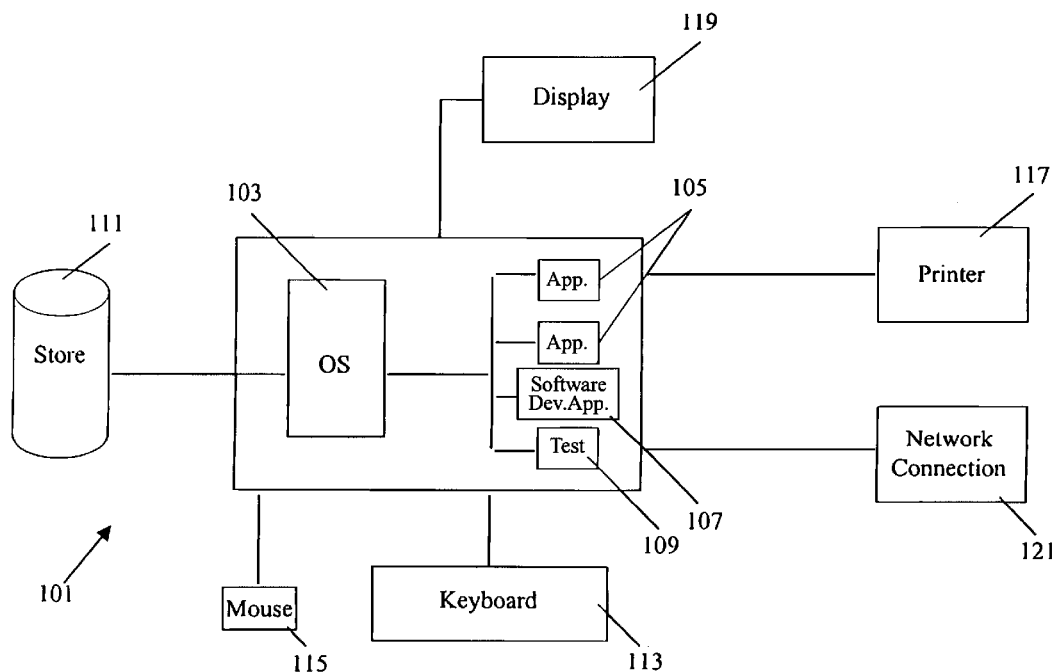
FIG. 1 is a schematic representation of a computer loaded with software embodying the present invention.

FIG. 1 illustrates a conventional computer 101 such as a PC, running a conventional operating system 103 such as Windows® and having a number of resident application programs 105 such as a word processing program, a network browser and e-mail program or a database management program. The computer 101 also includes a software development application program 107 that enables the user to write and compile new programs and a testing program 109 that enables testing to be carried out on programs. The computer 101 is also connected to a conventional disc storage unit 111 for storing data and programs, a keyboard 113 and mouse 115 for allowing user input and a printer 117 and display unit 119 for providing output from the computer 101. The computer 101 also has access to external networks (not shown) via a network card 121.

In conventional object oriented programming the programs are divided into conceptual sub-units called objects. Each object carries out predetermined functions much in the same way that a sub-routine might in conventional programming. Objects carry out processing of data and may co-operate with other objects to carry out some functions. Such co-operation is carried out via interfaces between the objects called arguments that are provided for passing commands, requests and data between the objects.

Each object is categorised into a class of objects. In fact, it is the class of an object that determines the functions and performance of an object. An object itself is an embodiment (or instance) of the class and can be created to carry out its function and then deleted once the function is complete. The creation of an object for a given class is carried out under the control of a constructor algorithm. In addition, the corresponding destructor for each class is arranged to remove the entry when the corresponding object is deleted.

Each object comprises one or more methods. Each method is a subroutine that together with other methods provides the functions of the object itself. Methods may co-operate with other objects to carry out functions/processing on behalf of the method. The methods are also defined by the class of the object as are the arguments of the object.

In summary, objects are functional units of software code whose functions are defined by the class of which a given object is an instance. Objects can have a number of states that change depending on the object's interaction with other objects or data. The combined interaction of the objects that make up a computer program provide the functions of the program itself.

Figure 2:
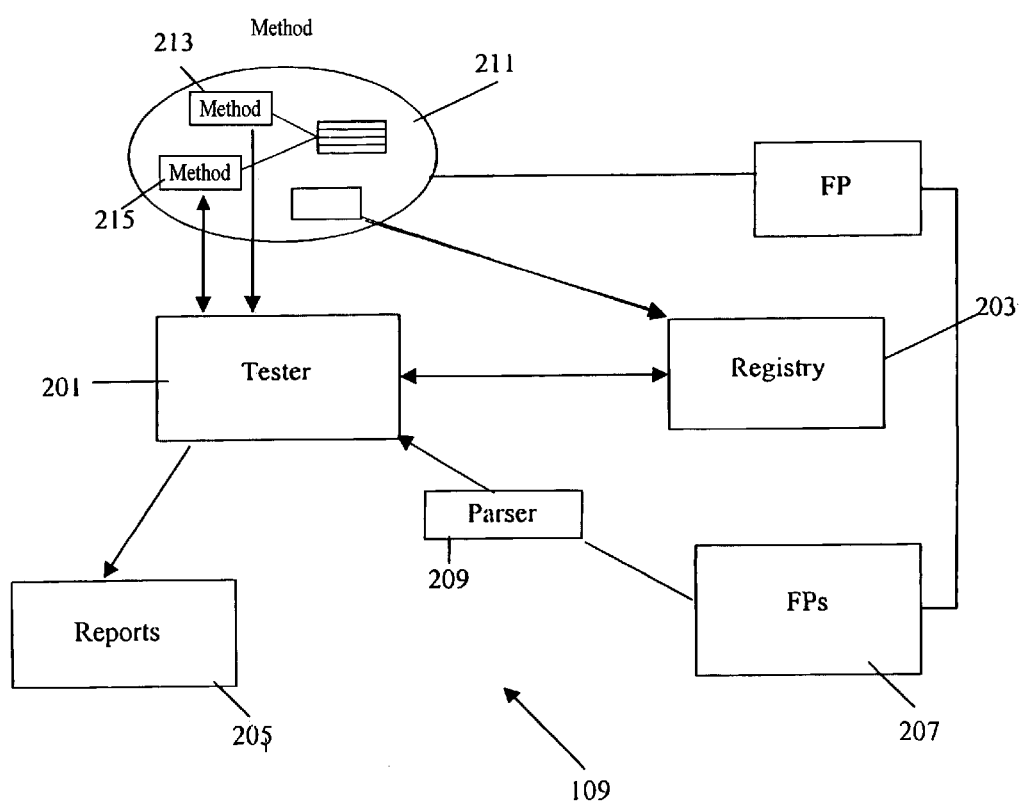
FIG. 2 is a functional block diagram of the program elements that comprise the software indicated in FIG. 1.

With reference to FIG. 2, the testing program 109 comprises five main components, a tester 201, an object registry 203, a report generator 205, a test criteria store 207 and a parser 209. The tester 201 carries out the testing of each object in the software program under test and passes the results of the tests to the report generator 205. The object registry 203 provides the tester 201 with a list of the objects that form part of the program at any given time (as noted above, objects may be created and destroyed during the operation of a program). The test criteria store 207 is used to hold the data and/or instructions necessary to test each of the objects registered in the object registry 203. In the present embodiment the data and/or instructions held in the test criteria store 207 are immediately usable by the tester 201. However, in some cases the data may be coded using a scripting language. In this case the parser 209 would be used to convert the data/instruction into a form usable by the tester 201. The functions and interactions of the five main components will be described in further detail below.

FIG. 2 also shows a program object 211 undergoing testing by the tester 201. The object 211 is a standard object but has three additional areas of functionality that allow it to interact automatically with the testing program 109. The added functionality is provided in the present embodiment by two special methods 213, 215 added to each class definition used in the program under test and by additions to the functionality of the constructor and destructor algorithms for the program.

Figure 3A:
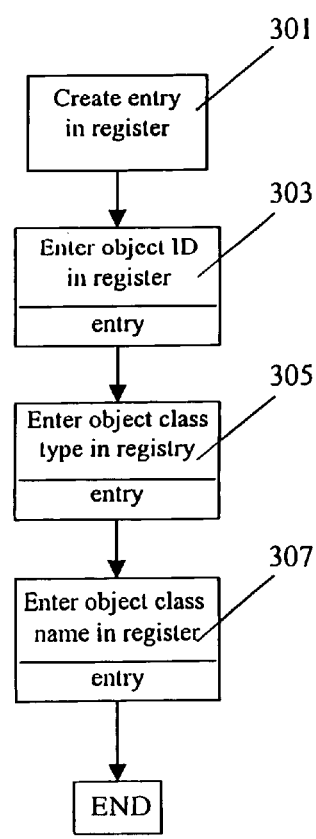
FIGS. 3a–b are flow diagrams illustrating part of the processing of the software shown in FIG. 2.

With reference to FIG. 3a, the constructor is arranged, on the instantiation of an object for a given class, to create an entry in the object registry 203 for the new object (see step 301 of FIG. 3a). Then, at step 303, the constructor enters the identification for the object in its entry in the registry 203 (each object, when it is constructed by the constructor, is assigned a unique identifier). At step 305, the class type of the object is entered in the entry for the object and at step 307 the corresponding class name is entered. After step 307 the registration process is completed and the constructor algorithm ends its processing.

Figure 3B:
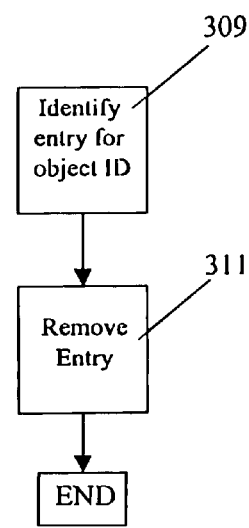

As noted above, when an object is no longer required it is deleted by a destructor algorithm. In the present embodiment, the destructor algorithm is also arranged to carry out the steps shown in FIG. 3b. At step 309 the destructor algorithm identifies the entry in the registry 203 that corresponds to the object being deleted and at step 311 removes the entry from the registry 203.

With reference to FIG. 4a, each class of object has a test criteria file that is entered into the test criteria store 207 when the first object of that class is entered in the object registry 203. The criteria are created during the design and implementation of the computer program under test and their precise construction is dependent on the testing methods being used. In the present embodiment, an entry is made in the store 207 for each class 401. For every class, an entry 403 is made for each method within the class. For each method 403, a definition of the input 405 to the method, the output 407 from the method, the start state 409 of the object when the method is performed and the end state 411 of the object on completion of the method is entered in the store 207.

Figure 5:
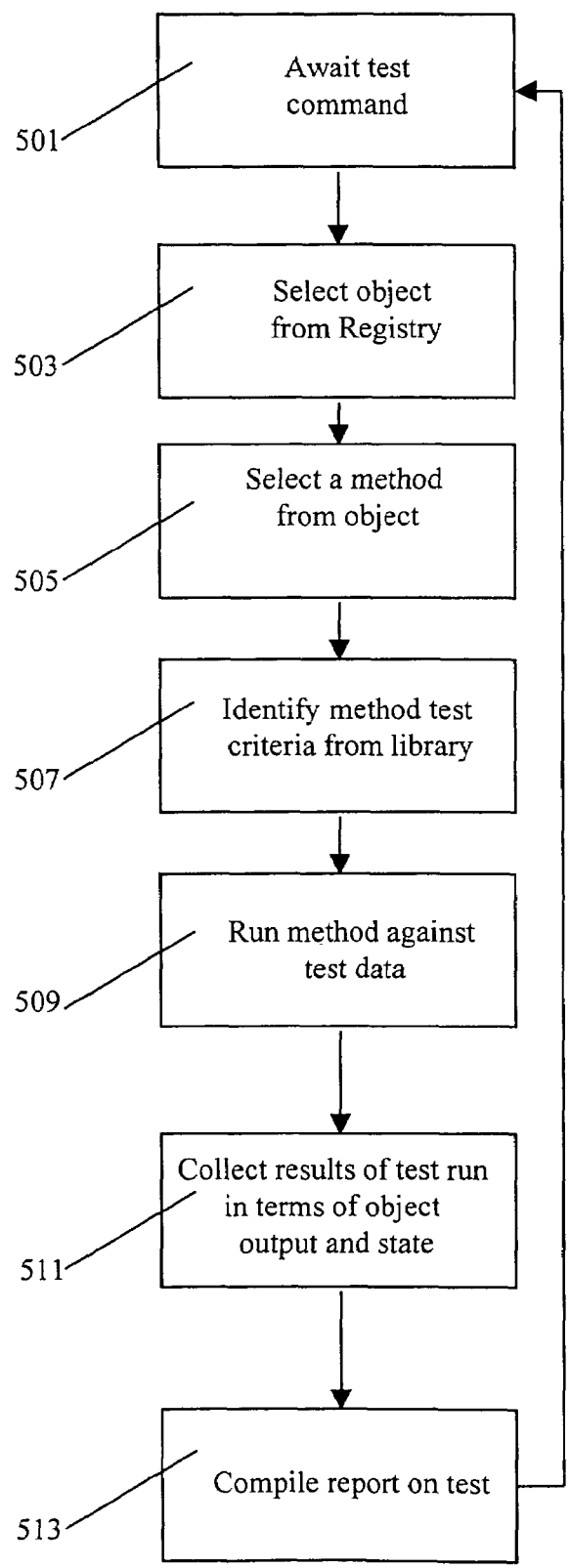
FIG. 5 is a flow diagram showing a further part of the processing of the software shown in FIG. 2.

The operation of the tester 201 will be described now with reference to FIG. 5 in which at step 501 the tester 201 awaits a command to commence testing. In the present embodiment the command is given by a user. Once the command has been received then, at step 503, the tester 201 chooses the class of object to be tested from the registry 203. In the present embodiment, the system responds to a user command to commence testing and then chooses a method at random. However, the command or choice of method could be produced randomly, in accordance with a predefined testing plan or in response to requests or events from other objects or programs.

At step 505 the tester 201 uses the first special method 213 to determine the number of methods in the chosen object. The method 213 returns data, as shown in FIG. 4b, describing the class of the object 413, identifications 415 of each of the methods in the object and a description 417 of the arguments for each of the method. At step 507, using the class identification returned by the method 213, the tester 201 identifies the appropriate test criteria from the test criteria store 207 and at step 509 runs the chosen method against the identified test criteria.

At step 511, the tester 201 uses the second special method 215 to capture the results of the test run on the method. The precise data that is captured is determined by the test criteria and may include the output data from the tested method, the resulting state of the object that the method is a part of and a list of other object or methods that the chosen method interacted with as a result of the test. At step 513, the test data collected in the previous step is compared to the test criteria and the results of the comparison are passed to the report generator 205 for inclusion in a test report. After step 513, the tester returns to step 501 to await a further test instruction.

The tester program 201 is designed to carry out its testing procedures on a program while the program is in operation. In some operating systems the testing program 201 could be arranged to run as a background process or be arranged to operate when there is a predetermined amount of spare processor resource available.

As will be understood by those skilled in the art, in some systems it may be necessary to include means for preventing changes to the run-time environment being made during the testing of a software element. These may be in the form of run-time test switches that are similar in function to a debug compiler switch. In some systems it may be necessary to include a means to restore the state of any persistent variables (variables that retain state after execution) affected by the tests. This can be performed by taking a copy of the persistent variables before a test and restoring them afterwards.

It will also be clear to those skilled in the art that the system under test could be distributed in nature. For example, testing could be carried out over a network and units of code distributed across many computers. Also, the testing system can be used by developers during the design and build of a software system or be provided as part of the functionality of programs that are ready for use.

The tester program is preferably written in the same language as the program that it is testing. However, although the embodiment above describes the testing of an object oriented programming language, it will be understood by those skilled in the art that the principles of the invention are also applicable to other programming languages. Other such languages may be modular programming languages (such as Modula-2) or sequential programming languages (such as Pascal). It should also be understood that the term "object" used in the this description is to be construed broadly so as to cover functions, methods, modules or agents.

As will be understood by those skilled in the art, the tester program 109 can be contained on various transmission and/or storage mediums such as a floppy disc, CD-ROM, or magnetic tape so that the program can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A computer-implemented method of testing an operational integrated software system, said system comprising a plurality of software elements, said method comprising the steps of:

a) automatically registering each active element of said plurality of software elements in a registry, said registry comprising a plurality of registered software elements, each element of which is associated with a set of test criteria;
b) associating a set of test criteria with each registered active element of software;
c) selecting an active element registered in the registry and testing the active element in accordance with the associated set of test criteria; and
d) capturing the results of the testing of the active element and comparing them to the associated test criteria.

2. The computer-implemented method according to claim 1 in which each element of software is arranged to automatically register an identification of itself in the registry.

3. The computer-implemented method according to claim 1 in which each element of software is arranged to capture the results of its testing.

4. The computer-implemented method according to claim 1 further comprising the step of automatically providing a report on the results of the testing.

5. The computer-implemented method according to claim 1 in which the test criteria are defined using a scripting language and said method further comprises the step of parsing the test criteria to convert them into a form for testing against.

6. A computer-based apparatus for testing an operational integrated software system, said system comprising a plurality of software elements, said apparatus comprising:
a) computer-implemented means for the automatic registration of each active element of said plurality of software elements;
b) computer-implemented means for associating a set of test criteria with each registered active element of software;
c) computer-implemented means for selecting a registered active element of software and testing the active element in accordance with the associated test criteria; and
d) computer-implemented means for comparing the results of the testing of the active element against the associated test criteria.

7. The computer-based apparatus according to claim 6 in which each element of software is provided with computer-implemented means for automatically registering itself.

8. The computer-based apparatus according to claim 6 in which each element of software is provided with computer-implemented means for capturing the results of its testing.

9. The computer-based apparatus according to claim 6 further comprising computer-implemented means for producing a report of the results of testing an element of software.

10. The computer-based apparatus according to claim 6 in which the test criteria are defined using a scripting language and the apparatus further comprises computer-implemented means for parsing the test criteria to convert them into a form for testing against.

11. A program storage device readable by a computer, tangibly embodying a program of instructions executable by the computer for causing the computer to carry out appropriate steps to implement a method of testing an operational integrated software system having a plurality of software elements, said method comprising steps of:
a) automatically registering each active element of said plurality of software elements in a registry;
b) associating a set of test criteria with each registered active element of software;
c) selecting an active element for testing from said active elements registered in the registry and testing the active element in accordance with the associated set of test criteria; and
d) capturing the results of the testing of the active element and comparing them to the associated test criteria.

12. A program storage device readable by a computer, into a computer and tangibly embodying a program of instructions executable by the computer for enabling the computer to provide an apparatus for testing an operational integrated software system having a plurality of software elements, said apparatus comprising:
a) means for the automatic registration of each active element of said plurality of software elements;
b) means for associating a set of test criteria with each registered active element of software;
c) means for selecting a registered active element of software and testing the active element in accordance with the associated test criteria; and
d) means for comparing the results of the testing of the active element against the associated test criteria.

13. A computer program product for testing an operational software system having a plurality of software elements, said computer program product comprising:
a computer readable storage medium having a computer readable code means embodied in said medium for causing testing of the operation software system, the computer program product having:
computer readable code means for causing a computer to automatically register each active element of the plurality of software elements;
computer readable code means for causing the computer to associate a set of test criteria with each registered active element of software;
computer readable code means for causing the computer to select a registered active element of software and test the active element in accordance with the associated test criteria; and
computer readable code means for causing the computer to compare the results of the testing of the active element against the associated test criteria.

* * * * *